United States Patent
Yi et al.

(10) Patent No.: US 11,574,773 B2
(45) Date of Patent: Feb. 7, 2023

(54) MULTILAYER ELECTRONIC COMPONENT

(71) Applicant: SAMSUNG ELECTRO-MECHANICS CO., LTD., Suwon-si (KR)

(72) Inventors: Young Soo Yi, Suwon-si (KR); Soung Jin Kim, Suwon-si (KR); Kun Hoi Koo, Suwon-si (KR); Jun Hyeon Kim, Suwon-si (KR); Kyung Ryul Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 7 days.

(21) Appl. No.: 17/490,039

(22) Filed: Sep. 30, 2021

(65) Prior Publication Data
US 2022/0189696 A1 Jun. 16, 2022

(30) Foreign Application Priority Data
Dec. 14, 2020 (KR) .................. 10-2020-0174342

(51) Int. Cl.
H01G 4/232 (2006.01)
H01G 4/30 (2006.01)
H01G 4/248 (2006.01)

(52) U.S. Cl.
CPC .......... H01G 4/2325 (2013.01); H01G 4/232 (2013.01); H01G 4/248 (2013.01); H01G 4/30 (2013.01)

(58) Field of Classification Search
None
See application file for complete search history.

(56) References Cited

U.S. PATENT DOCUMENTS

| | | | |
|---|---|---|---|
| 10,475,587 B2 * | 11/2019 | Onoue | H01G 4/2325 |
| 2011/0051314 A1 * | 3/2011 | Sakurai | H01G 4/30 361/321.1 |
| 2011/0157767 A1 * | 6/2011 | Hur | H01G 4/01 361/303 |
| 2016/0268046 A1 | 9/2016 | Nishisaka et al. | |
| 2018/0286583 A1 * | 10/2018 | Onoue | H01G 4/012 |
| 2022/0189696 A1 * | 6/2022 | Yi | H01G 4/30 |

FOREIGN PATENT DOCUMENTS

| | | | | |
|---|---|---|---|---|
| CN | 108695071 A | * | 10/2018 | ............. H01G 4/012 |
| EP | 0 777 242 A2 | | 6/1997 | |
| JP | 2003217969 A | * | 7/2003 | |
| KR | 10-0202500 B1 | | 6/1995 | |
| KR | 10-2016-0110123 A | | 9/2016 | |

* cited by examiner

*Primary Examiner* — Dion R. Ferguson
(74) *Attorney, Agent, or Firm* — Morgan, Lewis & Bockius LLP

(57) ABSTRACT

A multilayer electronic component includes a body including a dielectric layer and internal electrodes alternately stacked with the dielectric layer interposed therebetween; and an external electrode including a first electrode layer disposed externally on the body, connected to the internal electrodes, and including a conductive metal, a glass, a low melting point metal having a lower melting point than the conductive metal, and a pore, and a second electrode layer covering the first electrode layer and including a conductive metal, a glass, and a pore, wherein porosity of the first electrode layer is higher than porosity of the second electrode layer.

12 Claims, 4 Drawing Sheets

MULTILAYER ELECTRONIC COMPONENT

CROSS-REFERENCE TO RELATED APPLICATION(S)

This application claims benefit of priority to Korean Patent Application No. 10-2020-0174342 filed on Dec. 14, 2020 in the Korean Intellectual Property Office, the disclosure of which is incorporated herein by reference in its entirety.

BACKGROUND

1. Field

The present disclosure relates to a multilayer electronic component.

2. Description of Related Art

A multilayer ceramic capacitor (MLCC), a type of multilayer electronic component, may be a chip type capacitor mounted on the printed circuit boards of various types of electronic products such as image display devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacity, and relative ease of mounting. As various electronic devices such as computers, mobile devices, or the like are miniaturized and increased in terms of output, demand for miniaturization and high capacity of multilayer ceramic capacitors are increasing.

In order to implement such a high-capacity multilayer ceramic capacitor, thinning and multilayering of dielectric layers and internal electrodes are being actively performed. However, in such a high-capacity multilayer ceramic capacitor, as the number of layers to be designed increases, a volume and strength of the dielectric layers may decrease to have a limit in durability. In addition, when sintering at high temperature, there is a problem in that a crack may occur due to a difference in diffusion rates of metal between an internal electrode and an external electrode.

Accordingly, there is a need for a technology for improving durability of a multilayer ceramic capacitor by reducing a sintering temperature of the external electrode and suppressing the occurrence of cracks while ensuring connectivity between the internal electrode and the external electrode.

SUMMARY

An aspect of the present disclosure is to provide a multilayer electronic component in which the occurrence of cracks is suppressed while ensuring connectivity between an internal electrode and an external electrode.

However, the objects of the present disclosure are not limited to the above description, and will be more easily understood in the process of describing specific embodiments of the present disclosure.

According to an aspect of the present disclosure, an multilayer electronic component includes a body including a dielectric layer and internal electrodes alternately stacked with the dielectric layer interposed therebetween; and an external electrode including a first electrode layer disposed externally on the body, connected to the internal electrodes, and including a conductive metal, a glass, a low melting point metal having a lower melting point than the conductive metal, and a pore, and a second electrode layer covering the first electrode layer and including a conductive metal, a glass, and a pore, wherein the porosity of the first electrode layer is higher than the porosity of the second electrode layer.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
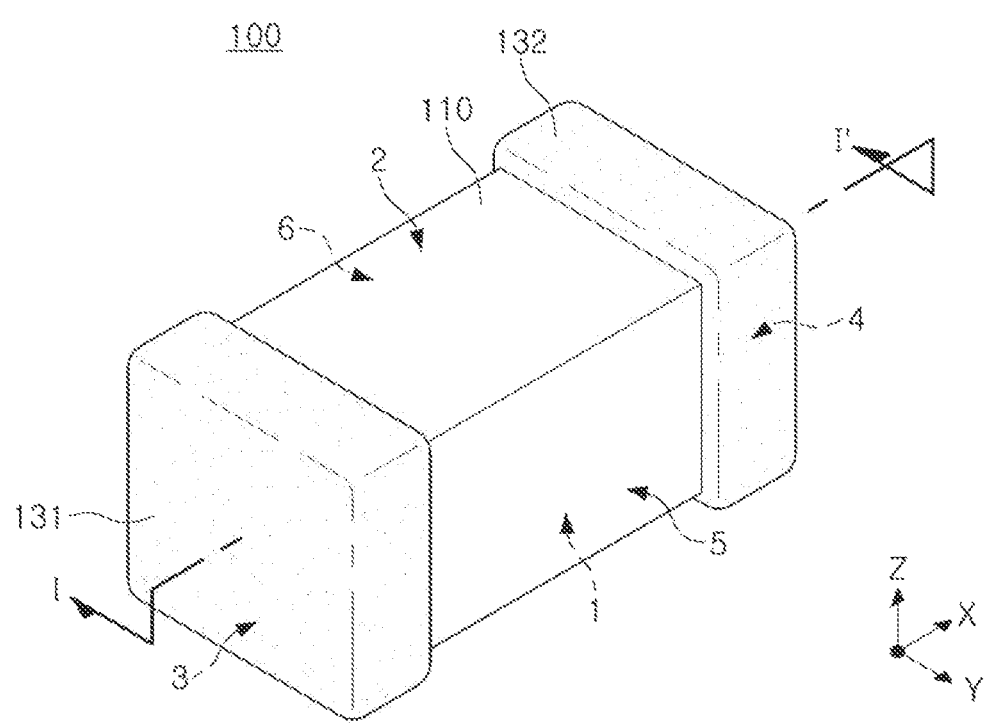
FIG. 1 is a perspective view schematically illustrating a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

When directions are defined in order to clearly describe embodiments of the present disclosure, X, Y, and Z indicated in the drawings represent a length direction, a width direction, and a thickness direction of a multilayer electronic component, respectively.

In addition, in the present specification, the length direction may be used as an X direction or a first direction, the width direction may be used as a Y direction or a second direction, and the thickness direction may be used as a Z direction, a third direction, or a stacking direction.

Multilayer Electronic Component

Figure 2:
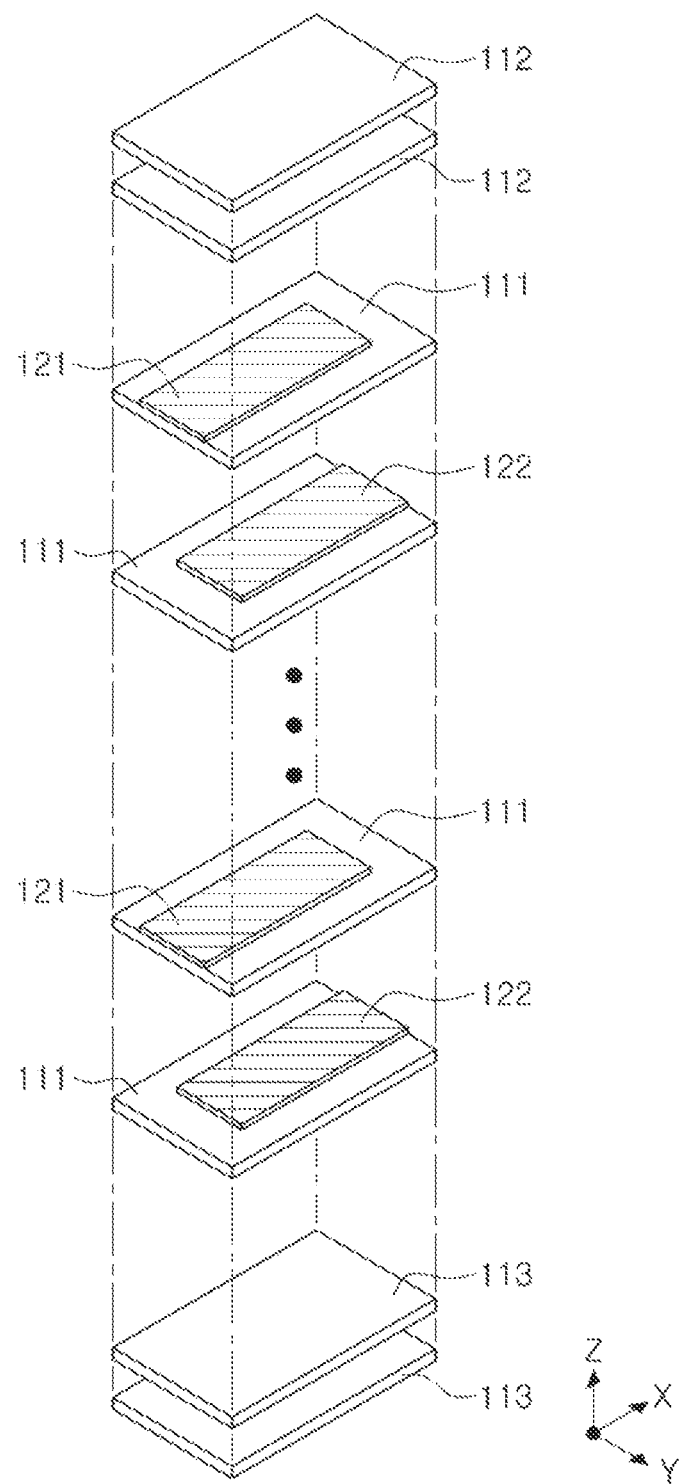
FIG. 2 is an exploded perspective view illustrating a body in which a dielectric layer and internal electrodes are stacked, according to an embodiment of the present disclosure.
Figure 3:
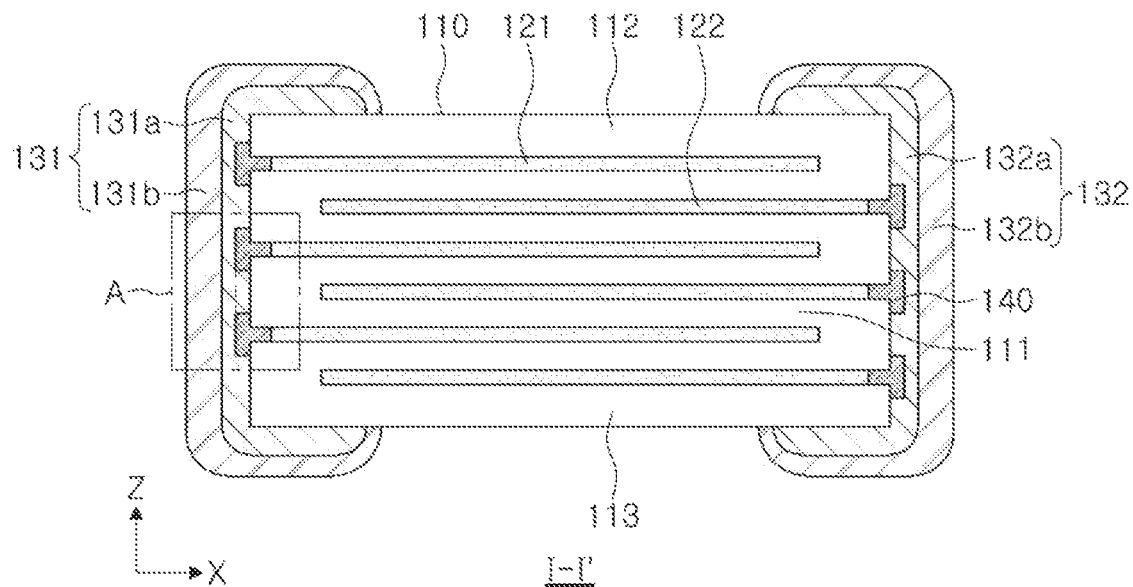
FIG. 3 is a cross-sectional view of FIG. 1, taken along line I-I'.
Figure 4:
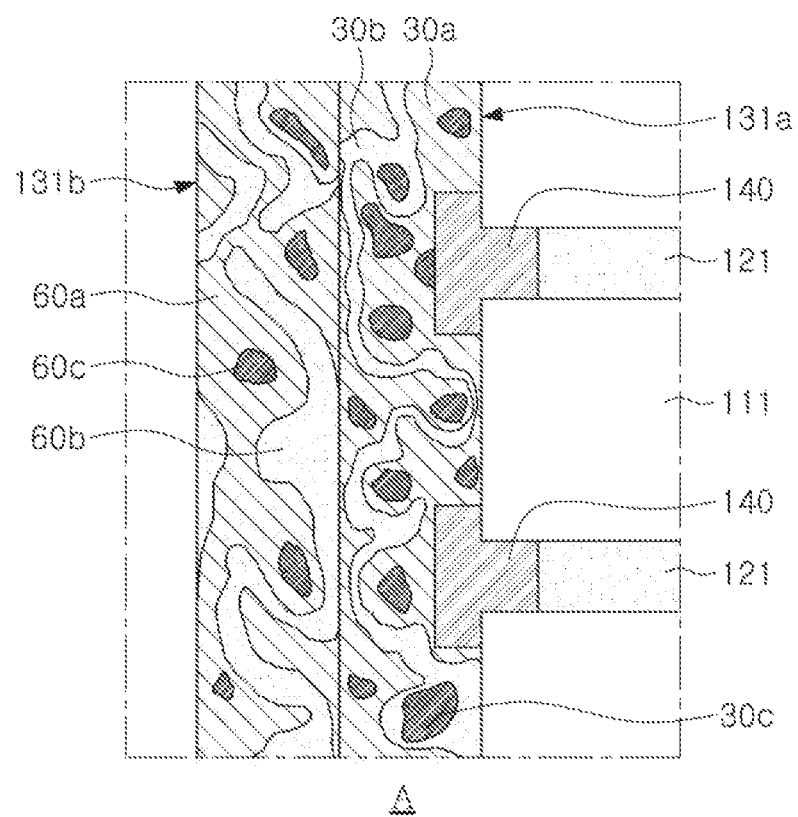
FIG. 4 is an enlarged view schematically illustrating portion A of FIG. 3.

FIG. 1 is a perspective view schematically illustrating a multilayer electronic component according to an embodiment of the present disclosure, FIG. 2 is an exploded perspective view illustrating a body in which a dielectric layer and internal electrodes are stacked, according to an embodiment of the present disclosure, FIG. 3 is a cross-sectional view of FIG. 1, taken along line I-I', and FIG. 4 is an enlarged view schematically illustrating portion A of FIG. 3.

Hereinafter, a multilayer electronic component according to an embodiment of the present disclosure will be described with reference to FIGS. 1 to 4.

A multilayer electronic component 100 according to an embodiment of the present disclosure may include a body 110 including a dielectric layer 111 and internal electrodes 121 and 122, and external electrodes 131 and 132 disposed externally on the body 110 and connected to the internal electrodes 121 and 122. The external electrodes 131 and 132 may include first electrode layers 131a and 132a and second electrode layers 131b and 132b, respectively, wherein the porosity of each of the first electrode layers 131a and 132a may be higher than the porosity of each of the second electrode layers 131b and 132b.

The body 110 may include a plurality of dielectric layers 111, and a plurality of internal electrodes 121 and 122 alternately stacked with each of the plurality of dielectric layers 111 interposed therebetween.

Although the specific shape of the body 110 is not particularly limited, as illustrated in FIG. 1, the body 110 may have a hexahedral shape or the like. Due to shrinkage of ceramic powders contained in the body 110 during a sintering process, the body 110 may not have a perfectly hexahedral shape with completely straight lines, but may have a substantially hexahedral shape overall.

The body 110 may have first and second surfaces 1 and 2 opposing each other in the thickness direction (the Z direction), third and fourth surfaces 3 and 4 connected to the first and second surfaces 1 and 2 and opposing each other in the longitudinal direction (the X direction), and fifth and sixth surfaces 5 and 6 connected to the first and second surfaces 1 and 2, connected to the third and fourth surfaces 3 and 4, and opposing each other in the width direction (the Y direction).

The plurality of dielectric layers 111 forming the body 110 may be in a sintered state, and a boundary between adjacent dielectric layers 111 may be apparent without using a scanning electron microscope (SEM).

A raw material for forming the dielectric layer 111 is not particularly limited, as long as sufficient capacitance may be obtained therewith. For example, a barium titanate-based material, a lead composite perovskite-based material, a strontium titanate-based material, or the like may be used.

Various ceramic additives, organic solvents, binders, dispersants, or the like may be added to the powder of barium titanate ($BaTiO_3$), and the like, according to the purpose of the present disclosure, as the material for forming the dielectric layer 111.

The body 110 may include a capacitance formation portion disposed in the body 110 and including the first and second internal electrode layers 121 and 122, disposed to oppose each other with the dielectric layer 111 interposed therebetween, to form capacity, an upper protective layer 112 disposed above the capacitance formation portion, and cover portions 112 and 113 formed above and below the capacitance formation portion.

The capacitance formation portion may be a portion contributing to formation of capacitance of the multilayer electronic component 100, and may be formed by repeatedly stacking the plurality of first and second internal electrodes 121 and 122 with the dielectric layer 111 interposed therebetween.

An upper cover portion 112 and a lower cover portion 113 may not include an internal electrode, maybe formed of the same material as the dielectric layer 111, and may basically play a role in preventing damage to the internal electrode due to physical or chemical stress. Referring to FIG. 2, the upper cover portion 112 and the lower cover portion 113 may be formed by stacking a single dielectric layer or two or more dielectric layers on upper and lower surfaces of the capacitance formation portion in the vertical direction, respectively.

The internal electrodes 121 and 122 may include a first internal electrode 121 and a second internal electrode 122, alternately disposed to oppose each other, with a dielectric layer 111 interposed therebetween.

Referring to FIG. 2, the body 110 may be formed by stacking a dielectric layer 111 on which the first internal electrode 121 is printed and a dielectric layer 111 on which a second internal electrode 122 is printed are alternately stacked in the thickness direction (the Z direction), and sintering then them.

The first and second internal electrodes 121 and 122 may be electrically separated from each other by a dielectric layer 111 disposed therebetween.

Referring to FIGS. 1 to 3, the first and second internal electrodes 121 and 122 may be exposed from the third and fourth surfaces 3 and 4 of the body 110, respectively. More specifically, the first internal electrode 121 may be spaced apart from the fourth surface 4 and may be exposed from the third surface 3, and the second internal electrode 122 may be spaced apart from the third surface 3 and may be exposed from the fourth surface 4.

A first external electrode 131 may be disposed on the third surface 3 of the body 110 to be connected to the first internal electrode 121, and a second external electrode 132 may be disposed on the fourth surface 4 of the body to be connected to the second internal electrode 122.

According to the above configuration, when a predetermined voltage is applied to the first and second external electrodes 131 and 132, electric charges may be accumulated between the first and second internal electrodes 121 and 122. In this case, capacitance of the multilayer electronic component 100 may be proportional to an area of the first and second internal electrodes 121 and 122 overlapping each other in the Z direction in the active region.

In addition, a material for forming the first and second internal electrodes 121 and 122 is not particularly limited. For example, the first and second internal electrodes 121 and 122 may be formed by using a conductive paste made of at least one of a noble metal such as platinum (Pt), palladium (Pd), palladium-silver (Pd—Ag) alloys, or the like, nickel (Ni), or copper (Cu).

In this case, as a printing method of the conductive paste, a screen-printing method or a gravure printing method maybe used, but the present disclosure is not limited thereto.

The external electrodes 131 and 132 may be disposed externally on the body 110 and may be connected to the internal electrodes 121 and 122. As illustrated in FIG. 3, the external electrodes 131 and 132 may include a first external electrode 131 and a second external electrode 132, respectively connected to the first and second internal electrodes 121 and 122.

The first and second external electrodes 131 and 132 maybe electrically connected to the first and second internal electrodes 121 and 122, respectively, to form capacitance, and the second external electrode 132 may be connected to a different potential than the first external electrode 131.

The first external electrode 131 may include a connection portion disposed on the third surface 3 of the body 110, and a bend portion extending from the connection portion to portions of the first and second surfaces 1 and 2. Likewise, the second external electrode 132 may include a connection portion disposed on the fourth surface 4 of the body 110, and a bend portion extending from the connection portion to portions of the first and second surfaces 1 and 2. In this case, the bend portion may extend not only to portions of the first and second surfaces 1 and 2, but also to portions of the fifth and sixth surfaces 5 and 6 from the connection portion.

In this embodiment, although a structure in which the multilayer electronic component 100 has two external electrodes 131 and 132 is described, the number, a shape, or the like of the external electrodes 131 and 132 may be changed, depending on a shape of the internal electrodes 121 and 122 or any other purpose.

The external electrodes 131 and 132 according to an embodiment of the present disclosure may include first electrode layers 131a and 132a and second electrode layers 131b and 132b covering the first electrode layers 131a and 132a. The porosity of each of the first electrode layers 131a and 132a maybe higher than the porosity of each of the second electrode layers 131b and 132b.

In the present specification, the porosity may refer to a volume ratio of an empty space, e.g., a pore, with respect to a total volume of the first electrode layers or the second electrode layers, and may refer to an average porosity.

Specifically, the porosity of the external electrode may be measured by an arithmetic mean for a ratio of an area in which a pore occupies, relative to a total area of a region in which an external electrode is disposed, in each cut surface determined by dividing a multilayer electronic component into ten (10) equal intervals in a direction, parallel to an X-Z plane.

The first electrode layers 131a and 132a may include a conductive metal, a glass, a low melting point metal having a lower melting point than the conductive metal, and a pore.

Referring to FIG. 4, the conductive metal and the low melting point metal may forma first metal portion 30a, the glass may form a first glass portion 30b around the first metal portion 30a, and a first pore portion 30c may be formed in some regions of the first metal portion 30a and the first glass portion 30b.

Volume ratios occupied by the first metal portion 30a, the first glass portion 30b, and the first pore portion 30c in the first electrode layers 131a and 132a may vary, and thereamong, the first metal portion 30a may be included in the highest ratio.

The conductive metal disposed in the first metal portion 30a may include Cu (copper). The conductive metal is not limited to Cu, and various materials having excellent conductivity, such as Ni (nickel) and Cu—Ni (copper-nickel alloy), may be used without limitation.

The conductive metal may serve to impart conductivity to the external electrodes 131 and 132, such that when the multilayer electronic component 100 is mounted on a printed circuit board and connected to an electrode pad, a voltage may be applied therefrom and may be transferred to the internal electrodes 121 and 122.

The low melting point metal disposed in the first metal portion 30a may include a metal having a melting point lower than a melting point of the conductive metal, and may include, for example, a Sn-based metal.

The Sn-based metal may include a Sn (tin) element as a main component, and may further include other metal components. In some embodiments, the Sn-based metal may be a Sn—Ag—Cu-based metal containing Sn as a main component and further containing trace amounts of Ag (silver) and Cu (copper).

When the low melting point metal is the Sn-based metal, a weight ratio of the Sn-based metal to the sum of the conductive metal and the Sn-based metal included in the first electrode layers 131a and 132a may be 2.5% or higher and 20% or lower. For example, when the conductive metal is Cu, a weight ratio of Cu to the Sn-based metal included in the first electrode layers 131a and 132a may satisfy a range of 97.5:2.5 to 80:20.

The weight ratio of the conductive metal to the Sn-based metal is not limited thereto, and various ratios in consideration of conductivity and stability may be applied. In addition, the low melting point metal is not limited to the Sn-based metal, and various materials having a lower melting point may be used, depending on components of the conductive metal included in the first electrode layers 131a and 132a.

The low melting point metal may serve to lower melting points of the external electrodes 131 and 132, especially the first electrode layers 131a and 132a, to sinter a multilayer electronic component 100 at a lower temperature.

As the sintering temperature increases, a difference in diffusion speed between the external electrodes 131 and 132 and the internal electrodes 121 and 122 may increase, such that probability of occurrence of a crack in a multilayer electronic component 100 may increase.

According to this embodiment, since the low melting point metal may be included in the first electrode layers 131a and 132a, an electronic component may be sintered at a lower temperature in a first sintering operation, after applying the first electrode layers 131a and 132a. Therefore, since a difference in diffusion speed between metals included in the first electrode layers 131a and 132a and the internal electrodes 121 and 122 may be reduced, occurrence of cracks generated during first sintering may be suppressed and durability may be improved.

When a low melting point metal such as an Sn-based metal or the like is included in each of the first electrode layers 131a and 132a as described above, due to the nature of the low melting point metal, there is a limit of lowering a density of each of the first electrode layers 131a and 132a in the final product. For example, each of the first electrode layers 131a and 132a according to this embodiment may have higher porosity than an external electrode that does not contain a low melting point metal, to lower reliability.

Therefore, the external electrodes 131 and 132 according to an embodiment of the present disclosure may include the second electrode layers 131b and 132b covering the first electrode layers 131a and 132a, respectively. Since each of the second electrode layers 131b and 132b may have lower porosity than each of the first electrode layers 131a and 132a, they may serve to protect an outside of the first electrode layers 131a and 132a, and may prevent reliability of the multilayer electronic component 100 being deteriorated.

The glass included in the first glass portion 30b may serve to improve adhesion and moisture resistance of the external electrodes 131 and 132. The glass maybe a composition in which oxides are mixed, but is not particularly limited, and maybe at least one selected from the group consisting of silicon oxide, boron oxide, aluminum oxide, transition metal oxide, alkali metal oxide, and alkaline earth metal oxide.

The second electrode layers 131b and 132b may include a conductive metal, a glass, and a pore.

Referring to FIG. 4, the conductive metal may form a second metal portion 60a, the glass may form a second glass portion 60b around the second metal portion 60a, and the pores may form a second pore portion 60c in some regions of the second metal portion 60a and the second glass portion 60b.

Volume ratios occupied by the second metal portion 60a, the second glass portion 60b, and the second pore portion 60c in the second electrode layers 131b and 132b may vary, and thereamong, the second metal portion 60a maybe included in the highest ratio.

The conductive metal disposed on the second metal portion 60a may include Cu (copper). The conductive metal is not limited to Cu, and various materials having excellent conductivity, such as Ni (nickel) and Cu—Ni (copper-nickel alloy), may be used without limitation.

The conductive metal may serve to impart conductivity to the external electrodes 131 and 132, such that when the multilayer electronic component 100 is mounted on a printed circuit board and connected to an electrode pad, a voltage may be applied therefrom and may be transferred to the internal electrodes 121 and 122.

As an example, unlike the first metal portion 30a, a low melting point metal may not be included in the second metal portion 60a. For example, the second electrode layers 131b and 132b may not include a low melting point metal, and may include only a conductive metal.

The second electrode layers 131b and 132b do not necessarily exclude the low melting point metal, and may include a low melting point metal in an amount smaller than that of each of the first electrode layers 131a and 132a.

For example, in some embodiments, the second electrode layers 131b and 132b may further include a low melting point metal, and a molar amount of the low melting point metal included in the first electrode layers 131a and 132a may be higher than a molar amount of the low melting point metal included in the second electrode layers 131b and 132b.

In this case, the low melting point metal disposed in the second metal portion 60b may include an Sn-based metal. The Sn-based metal may have Sn (tin) as a main component, and may further include other metal components. As an example, the Sn-based metal may be an Sn—Ag—Cu-based metal containing Sn as a main component and further containing a trace amount of Ag (silver) and Cu (copper).

In addition, when the low melting point metal is the Sn-based metal, a weight ratio of the Sn-based metal to the sum of the conductive metal and the Sn-based metal included in the second electrode layers 131b and 132b may be less than 2.5%.

The low melting point metal is not limited to the Sn-based metal, and various materials having a lower melting point may be used, depending on components of the conductive metal included in the second electrode layers 131b and 132b.

As such, the second electrode layers 131b and 132b may not contain a low melting point metal. In some embodiments, a molar amount of the low melting point metal in the second electrode layers 131b and 132b may be lower than that of the first electrode layers 131a and 131b such that less pores may be formed in the second electrode layers 131b and 132b. For example, the porosity of each of the second electrode layers 131b and 132b may be lower than the porosity of each of the first electrode layers 131a and 131a, because the porosity may increase due to inclusion of the low melting point metal.

The glass included in the second glass portion 60b may serve to improve adhesion and moisture resistance of the external electrodes 131 and 132. The glass may be a composition in which oxides are mixed, but is not particularly limited, and may be at least one selected from the group consisting of silicon oxide, boron oxide, aluminum oxide, transition metal oxide, alkali metal oxide, and alkaline earth metal oxide.

The first electrode layers 131a and 132a may have higher porosity than the second electrode layers 131b and 132b. In this case, the porosity may refer to an average porosity as described above.

Referring to FIG. 4, the porosity of each of the first electrode layers 131a and 132a may refer to an area ratio of the first pore portion 30c, relative to a total area of the first metal portion 30a, the first glass portion 30b, and the first pore portion 30c.

The porosity of each of the second electrode layers 131b and 132b may refer to an area ratio of the second pore portion 60c, relative to a total area of the second metal portion 60a, the second glass portion 60b, and the second pore portion 60c.

Therefore, the porosity of each of the first electrode layers 131a and 132a may be derived by acquiring an area ratio occupied by the first pore portion 30c among a total area of each of the first electrode layers 131a and 132a, and porosity of each of the second electrode layers 131b and 132b may be derived by acquiring an area ratio occupied by the second pore portion 60c among a total area of each of the second electrode layers 131b and 132b.

According to this embodiment, since the porosity of each of the first electrode layers 131a and 132a may be higher than the porosity of each of the second electrode layers 131b and 132b, an area ratio of the first pore portion 30c among the first electrode layers 131a and 132a may be higher than an area ratio of the second pore portion 60c among the second electrode layers 131b and 132b. These features can also be confirmed in a photograph of FIG. 5 to be described later.

Since the second electrode layers 131b and 132b may exhibit lower porosity than the first electrode layers 131a and 132a, each of the second electrode layers 131b and 132b may have a higher density than each of the first electrode layers 131a and 132a. Therefore, the second electrode layers 131b and 132b disposed outside the external electrodes 131 and 132 may perform a function of improving reliability such as moisture resistance and durability of the multilayer electronic component 100.

For example, the first electrode layers 131a and 132a may contain a higher molar amount of the low melting point metal than that of the second electrode layers 131b and 132b, to play a role of reducing connectivity with the internal electrodes 121 and 122 and frequency of occurrence of cracks, and the second electrode layers 131b and 132b may play a role of externally reinforcing a decrease in reliability according to the porosity of the first electrode layers 131a and 132a that may be generated accordingly.

Referring to FIGS. 3 and 4, an intermetallic compound 140 (also referred to as an IMC layer) may be disposed on an interface between the first electrode layers 131a and 132a and the internal electrodes 121 and 122.

As shown in the drawings, the intermetallic compound 140 may be formed in a region including a portion of the first electrode layers 131a and 132a and a portion of the internal electrodes 121 and 122. In this case, the intermetallic compound 140 may be arranged in various shapes, and since the intermetallic compound 140 may be formed by diffusion, the intermetallic compound 140 may have an irregular shape. For example, shapes of intermetallic compounds 140 disposed on each of the interfaces may be different from each other.

The intermetallic compound 140 may include an alloy composed of a conductive metal and a low melting point metal included in the first electrode layers 131a and 132a and a metal included in the internal electrodes 121 and 122.

For example, when the first electrode layers 131a and 132a contain Cu and Sn-based metals and the internal electrodes 121 and 122 contain Ni, the intermetallic compound 140 may include an Ni—Sn—Cu-based intermetallic compound. Components of the intermetallic compound 140 are not limited thereto, and may be variously changed, depending on metal components included in the first electrode layers 131a and 132a and the internal electrodes 121 and 122.

The intermetallic compound 140 formed on the interface between the first electrode layers 131a and 132a and the internal electrodes 121 and 122 may play a role of improving electrical connectivity between the first electrode layers 131a and 132a and the internal electrodes 121 and 122. For example, when sintering at a low temperature, there may be a limit in that the electrical connectivity between the external electrodes 131 and 132 and the internal electrodes 121 and 122 is deteriorated. According to this embodiment, electrical connectivity may be improved.

For example, due to the low melting point metal included in the first electrode layers 131a and 132a, a sintering temperature may be lowered to prevent the occurrence of cracks. Even when the multilayer electronic component 100 is sintered at a low temperature, electrical connectivity between the external electrodes 131 and 132 and the internal electrodes 121 and 122 may be maintained due to the intermetallic compound 140 formed on the interface between the first electrode layers 131a and 132a and the internal electrodes 121 and 122.

The first and second external electrodes 131 and 132 may further include a plating layer. The plating layer may include first and second nickel (Ni) plating layers, and first and second tin (Sn) plating layers respectively covering the first and second nickel plating layers.

Hereinafter, a method of manufacturing a multilayer electronic component 100 according to an embodiment of the present disclosure will be described.

First, a plurality of ceramic green sheets may be prepared.

The ceramic green sheets maybe for forming a dielectric layer 111 of a body 110. Ceramic powder particles, a polymer, and a solvent may be mixed to prepare a slurry, and the slurry may be formed to have a sheet shape by a method such as a doctor blade or the like.

In this case, the ceramic powder particles included in the slurry forming the dielectric layer may have $BaTiO_3$ as a main component.

Thereafter, internal electrodes 121 and 122 may be formed by printing a conductive paste for internal electrodes on at least one surface of each of the ceramic green sheets. The conductive paste for internal electrodes may be formed by selecting one of Ni, Cu, or an alloy thereof.

The printing method of the conductive paste for internal electrodes may be a screen-printing method or a gravure printing method.

Referring to FIG. 2, a plurality of ceramic green sheets laminated by alternately stacking a ceramic green sheet printed with a first internal electrode 121 and a ceramic green sheet printed with a second internal electrode 122 and pressing them in the stacking direction, and internal electrodes formed on the ceramic green sheets may be pressed together, to forma stack body.

In addition, at least one ceramic green sheet may be stacked above and below the stack body, to form cover portions 112 and 113. The cover portions 112 and 113 may have the same composition as the dielectric layer 111 located inside the stack body, and differ from the dielectric layer 111 in that they do not include internal electrodes.

Thereafter, the stack body may be cut into chips for each region corresponding to one (1) capacitor, and may be then sintered at a high temperature to complete the body 110.

Thereafter, second external electrodes 131 and 132 may be formed to be electrically connected to the first and second internal electrodes 121 and 122 by covering exposed portions of the first and second internal electrodes 121 and 122 exposed from both lateral surfaces of the body 110.

First, an external electrode paste may be applied to both lateral surfaces of the body 110 to form first electrode layers 131a and 132a.

The external electrode paste may include, for example, fine spherical particles of Cu and Sn-based solder powder particles. In this case, with respect to the total weight of Cu and Sn-based solder powder particles, the Cu may be added in a weight ratio of 80 to 97.5%, and the Sn-based solder powder particles may be added in a weight ratio of 2.5 to 20%, respectively.

In addition, the external electrode paste may further include a glass frit, a binder, or the like.

In this manner, after applying the external electrode paste on both lateral surfaces of the body 110, a first sintering operation may be performed. In the sintering operation, an intermetallic compound 140 may be formed on an interface between the first electrode layers 131a and 132a and the internal electrodes 121 and 122 by diffusion of a metal.

In addition, after the formation of the first electrode layers 131a and 132a, a hydrophobic plasma treatment may be additionally included.

Thereafter, second electrode layers 131b and 132b maybe formed by secondly applying an external electrode paste in positions in which the first electrode layers 131a and 132a are formed.

The external electrode paste may include, for example, fine spherical particles of Cu powder, glass frit, a binder, and the like. In this case, although a low melting point metal such as Sn-based solder powder particles may be included in the secondly applied external electrode paste, it is reasonable to add the low melting point metal at a lower ratio than that included in the first electrode layers 131a and 132a.

In this manner, after the external electrode paste is secondly applied to cover the first electrode layers 131a and 132a, to perform a second sintering operation.

Subsequently, surfaces of the second electrode layers 131b and 132b maybe plated with nickel (Ni) or tin (Sn), as necessary.

Experimental Example

Table 1 below illustrates results of measuring the porosity of first electrode layers 131a and 132a and the porosity of second electrode layers 131b and 132b, when a weight ratio of an Sn-based metal relative to the sum of Cu and Sn-based solder powder particles included in first electrode layers 131a and 132a is 20%.

Specifically, in the first electrode layers 131a and 132a applied in an experiment of Table 1, Cu was added as a conductive metal, and Sn-based solder powder particles, i.e., an Sn—Ag—Cu-based metal was added as a low melting point metal. In this case, a weight ratio of Cu:Sn-based solder powder particles was set to 80:20, and for the Sn-based solder powder particles, a weight ratio of Sn:Ag:Cu-based solder powder particles was set to 96.5:3.0:0.5.

In the second electrode layers 131b and 132b of Table 1, Cu as a conductive metal was included, in the similar manner to the first electrode layers 131a and 132a, and a low melting point metal such as Sn-based solder powder particles were not included.

Each of Experimental Examples 1 to 5 in Table 1 illustrates results of measuring the porosity of the first and second electrode layers, respectively, for five (5) chips manufactured under the same conditions as above.

In this case, the porosity of each of the first electrode layers was measured by an arithmetic mean for a ratio of an area which the first pore portion 30c occupies, relative to a total area of a region in which each of the first electrode layers 131a and 132a was disposed, in each cut surface determined by dividing the second sintered chip into ten (10) equal intervals in a direction, parallel to an X-Z plane.

In addition, the porosity of each of the second electrode layers was results of measuring an arithmetic mean for a ratio of an area in which the second pore portion 60c occupies, relative to a total area of a region in which each of the second electrode layers 131b and 132b was disposed, in each cut surface of the same chip as measuring the porosity of the first electrode layers.

TABLE 1

| Experimental Example | Porosity of First Electrode Layer (%) | Porosity of Second Electrode Layer (%) |
|---|---|---|
| 1 | 4.83 | 0.99 |
| 2 | 7.96 | 1.16 |
| 3 | 3.19 | 0.98 |
| 4 | 8.39 | 0.64 |
| 5 | 9.97 | 0.37 |

Referring to Table 1 above, it can be seen that in all of the multilayer electronic components according to each of the experimental examples, the porosity of the first electrode layer was higher than the porosity of the second electrode layer. This may be interpreted as a result of an increase in ratio of pores in an Sn-based solder, a low melting point metal included in the first electrode layer.

In this case, as can be seen in Table 1, the porosity of the first electrode layer according to each of the embodiments fell within a range of 3.19% or higher to 9.97% or lower. In addition, the porosity of the second electrode layer according to each of the embodiments fell within a range of 0.37% or higher to 1.16% or lower.

As described above, since the porosity of the second electrode layer according to this embodiment was lower, density of each of the second electrode layers 131b and 132b disposed outside each of the external electrodes 131 and 132 may be excellent, and reliability such as moisture resistance, durability, and the like of the multilayer electronic component 100 may be improved.

Therefore, in a multilayer electronic component 100 according to an embodiment of the present disclosure, the porosity of each of the second electrode layers 131b and 132b may be 0.37% or higher and 1.16% or lower.

Further, since a sintering temperature of the first electrode layer may be lowered by the low melting point metal included in the first electrode layer, diffusion between the metals included in the first electrode layers 131a and 132a and the internal electrodes 121 and 122 may decrease to lower probability of occurrence of a crack in the multilayer electronic component 100. For example, a crack generated during the first sintering may be suppressed to improve moisture resistance reliability.

In addition, as the low melting point metal is added as described above, the porosity of the first electrode layer may be higher than the porosity of the second electrode layer.

Therefore, in a multilayer electronic component 100 according to an embodiment of the present disclosure, the porosity of each of the first electrode layers 131a and 132a may be 3.19% or higher and 9.97% or lower.

Also, referring to Table 1, it can be seen that the porosity of the first electrode layer according to each embodiment satisfied a range of more than 3.25 times to 26.95 times or less of the porosity of the second electrode layer.

As described above, the external electrodes 131 and 132 according to this embodiment may be formed in a multi-layered structure including the first and second electrode layers 131a, 132a, 131b, and 132b, and exhibit different porosities, to improve connectivity and reliability of the external electrodes 131 and 132 at the same time.

For example, each of the first electrode layers 131a and 132a may contain a relatively high ratio of the low melting point metal, to reduce connectivity with the internal electrodes 121 and 122 and frequency of occurrence of cracks, and each of the second electrode layer 131b and 132b may play a role of externally reinforcing reliability according to porosity of each of the first electrode layers 131a and 132a resulting therefrom.

Therefore, in a multilayer electronic component 100 according to an embodiment of the present disclosure, the porosity of each of the first electrode layers 131a and 132a satisfies a range of more than 3.25 times to 26.95 times or less with respect to the porosity of each of the second electrode layers 131b and 132b.

Figure 5:
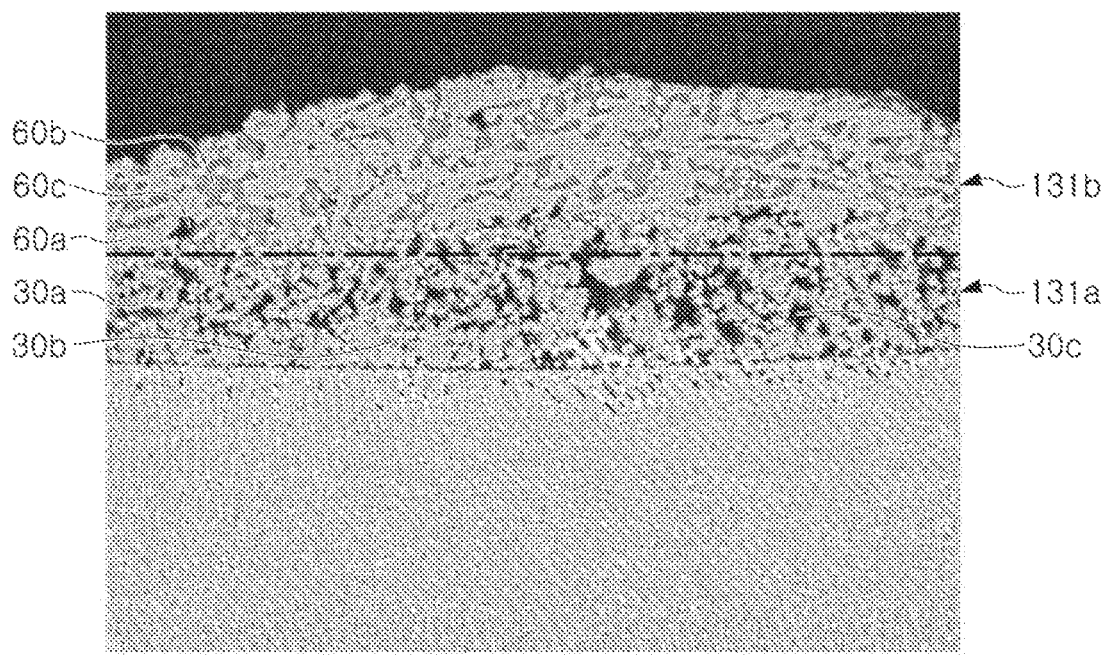
FIG. 5 is a photograph of an external electrode according to an embodiment of the present disclosure.

FIG. 5 is a photograph of an external electrode according to an embodiment of the present disclosure.

In the photograph of FIG. 5, the darkest portion indicates a region in which pores are formed, e.g., a pore portion, a lighter portion indicates a glass portion, and the brightest portion indicates a metal portion including a conductive metal and a low melting point metal.

Referring to FIG. 5, an overall distribution ratio of a first pore portion 30c of a first electrode layer 131a and a second pore portion 60c of a second electrode layer 131b can be confirmed.

As illustrated in FIGS. 3 and 4, it can be seen that an area of the first pore portion 30c, relative to a total area of the first metal portion 30a, the first glass portion 30b, and the first pore portion 30c included in the first electrode layer 131a occupies a relatively high proportion.

It can be seen that an area of the second pore portion 60c, relative to a total area of the second metal portion 60a, the second glass portion 60b, and the second pore portion 60c included in the second electrode layer 131b occupies a relatively low proportion.

As described above, the external electrodes 131 and 132 according to this embodiment may be formed in a multilayer structure including the first and second electrode layers 131a and 131b, and may exhibit different porosities.

Therefore, the first electrode layer 131a may maintain electrical connection with the internal electrodes 121 and 122 and may have a low sintering temperature, to prevent cracks from occurring in the multilayer electronic component 100. In addition, the second electrode layer 131b may cover the first electrode layer 131a having a low density externally, to improve durability and moisture resistance of the external electrodes 131 and 132.

According to an embodiment of the present disclosure, a sintering temperature of an external electrode may be lowered to have an effect of suppressing cracks generated when sintering a multilayer electronic component at a high temperature.

Further, according to an embodiment of the present disclosure, an IMC layer may be formed between an internal electrode and an external electrode to improve electrical connectivity.

In addition, according to an embodiment of the present disclosure, a second electrode layer having a high density may be provided on the external electrode to secure reliability, even when an external electrode sintered at a low temperature is applied.

However, various advantages and effects of the present disclosure are not limited to the above description, and may be more easily understood in the process of describing specific embodiments of the present disclosure.

While example embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and internal electrodes alternately stacked with the dielectric layer interposed therebetween; and
an external electrode including a first electrode layer disposed on the body, connected to the internal electrodes, and including a conductive metal, a glass, a low melting point metal having a lower melting point than the conductive metal, and a pore, and a second electrode layer covering the first electrode layer and including a conductive metal, a glass, and a pore,
wherein porosity of the first electrode layer is higher than porosity of the second electrode layer.

2. The multilayer electronic component of claim 1, wherein an intermetallic compound is disposed on an interface between the first electrode layer and the internal electrode.

3. The multilayer electronic component of claim 2, wherein the intermetallic compound comprises an Ni—Sn—Cu-based intermetallic compound.

4. The multilayer electronic component of claim 2, wherein the intermetallic compound is included in a region including a portion of the first electrode layer and a portion of the internal electrode.

5. The multilayer electronic component of claim 1, wherein the low melting point metal comprises an Sn-based metal.

6. The multilayer electronic component of claim 5, wherein a weight ratio of the Sn-based metal to a sum of the conductive metal and the Sn-based metal included in the first electrode layer is 2.5% or higher and 20% or lower.

7. The multilayer electronic component of claim 5, wherein the Sn-based metal is an Sn—Ag—Cu-based metal.

8. The multilayer electronic component of claim 1, wherein the porosity of the first electrode layer is in a range of more than 3.25 times to 26.95 times or less of the porosity of the second electrode layer.

9. The multilayer electronic component of claim 1, wherein the porosity of the first electrode layer is 3.19% or higher and 9.97% or lower of a total area of the first electrode layer.

10. The multilayer electronic component of claim 1, wherein the porosity of the second electrode layer is 0.37% or higher and 1.16% or lower of a total area of the second electrode layer.

11. The multilayer electronic component of claim 1, wherein the second electrode layer further comprises the low melting point metal,
wherein a molar amount of the low melting point metal contained in the first electrode layer is higher than a molar amount of the low melting point metal contained in the second electrode layer.

12. The multilayer electronic component of claim 1, wherein the conductive metal comprises Cu.

* * * * *